United States Patent
Gregori

(10) Patent No.: US 7,372,224 B2
(45) Date of Patent: May 13, 2008

(54) SYSTEM AND METHOD FOR DETERMINING BARRIER MOTOR PARAMETERS WITHOUT USING SENSORS

(75) Inventor: Eric Michael Gregori, Lindenhurst, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 11/241,091

(22) Filed: Sep. 30, 2005

(65) Prior Publication Data
US 2007/0075669 A1    Apr. 5, 2007

(51) Int. Cl.
*E05F 15/16* (2006.01)
*H02P 1/04* (2006.01)

(52) U.S. Cl. ............... 318/268; 318/272; 318/286; 318/459; 318/469; 388/928.1

(58) Field of Classification Search ........ 318/264–272, 318/286, 466–470, 459; 388/928.1
See application file for complete search history.

(56) References Cited

U.S. PATENT DOCUMENTS

| | | | | |
|---|---|---|---|---|
| 3,568,027 A | * | 3/1971 | Bacon et al. | 388/823 |
| 4,510,423 A | * | 4/1985 | Iwasawa | 388/821 |
| 4,675,586 A | * | 6/1987 | Eigner et al. | 318/458 |
| 5,448,149 A | * | 9/1995 | Ehsani et al. | 318/701 |
| 5,811,947 A | | 9/1998 | Hurst et al. | |
| 5,838,126 A | * | 11/1998 | Llerena | 318/286 |
| 5,977,732 A | | 11/1999 | Matsumoto | |
| 6,411,873 B1 | * | 6/2002 | Rogovin | 701/36 |
| 6,838,847 B2 | * | 1/2005 | Dragoi et al. | 318/434 |
| 6,906,487 B2 | * | 6/2005 | de Frutos | 318/468 |
| 2003/0103306 A1 | | 6/2003 | Nakazawa et al. | |
| 2003/0137265 A1 | | 7/2003 | de Frutos | |

FOREIGN PATENT DOCUMENTS

| | | |
|---|---|---|
| EP | 1 158 642 A1 | 11/2001 |
| GB | 2 282 639 | 4/1995 |
| GB | 2 287 369 A | 9/1995 |
| WO | WO 85/01773 | 4/1985 |

* cited by examiner

*Primary Examiner*—Bentsu Ro
(74) *Attorney, Agent, or Firm*—Fitch, Even, Tabin & Flannery

(57) ABSTRACT

A barrier operator comprises a first measuring apparatus for measuring a current used by a direct current (dc) motor to move a barrier and a second measuring apparatus for measuring a generated voltage of the dc motor. A controller is coupled to the first measuring apparatus and the second measuring apparatus. The controller is programmed to calculate a torque of the dc motor by using the current and to determine when an obstruction exists in the path of the barrier based upon the calculated torque.

5 Claims, 4 Drawing Sheets

SYSTEM AND METHOD FOR DETERMINING BARRIER MOTOR PARAMETERS WITHOUT USING SENSORS

FIELD OF THE INVENTION

The field of the invention relates to moveable barrier operators and, more specifically, to determining characteristics of these systems.

BACKGROUND

Different types of moveable barrier operators have been sold over the years and these systems have been used to actuate various types of moveable barriers. For example, garage door operators have been used to move garage doors and gate operators have been used to open and close gates.

Such barrier movement operators may include a wall control unit, which is connected to send signals to a head unit thereby causing the head unit to open and close the barrier. In addition, these operators often include a receiver unit at the head unit to receive wireless transmissions from a hand-held code transmitter or from a keypad transmitter, which may be affixed to the outside of the area closed by the barrier or other structure.

Barrier operators sometimes include the ability to determine the torque of the motor. The torque may be used in a variable speed motor to determine whether the barrier has reached an obstruction. In previous systems, the operator received information related to the torque of the motor by using a tachometer (or some other type of sensor or sensing device), reading the speed of the motor, and deriving the torque from the amount of speed reduction of the motor.

Positional information concerning the barrier may also be determined and used in operator systems, for example, to determine when to slow down the barrier as the barrier approaches a limit such as the ground. In previous systems, tachometers (or other types of sensors or sensing devices) were used to determine the position of the barrier. In one example, the number of tachometer pulses was measured from a limit or a pass point, in order to determine the position of the barrier.

Unfortunately, the above-mentioned previous systems required the use of an extra component, the tachometer, which significantly increased the cost of the system. In addition, when a tachometer was used, other additional circuitry and/or software were frequently required to allow this additional component to operate. Another problem associated with previous systems was that only certain types of sensors or sensing devices could be used with certain types of motors, so that the user could not easily change motor types. This lack of flexibility added to user frustration, for instance, when a certain type of motor was not available or too costly for the user.

SUMMARY

A system and method are provided that determine different operating characteristics of a motor without using additional sensors and/or software. The approaches described herein are cost effective to implement, simple to use, and allow a user the flexibility to choose from a large variety of motors types to suit their application and needs.

In accordance with the principles described herein, a barrier operator may determine the current and/or motor voltage of a direct current (dc) motor and thereby derive information concerning a moveable barrier being driven by the motor. For instance, motor current can be determined and used to determine motor torque. The torque can then be used to determine whether the barrier has reached an obstruction. In another example, back electromagnetic force (emf) motor voltage can be ascertained and used to determine motor speed. The speed, in turn, may be used to determine the position of the barrier. In still another example, the back emf motor voltage can be measured and used to determine motor speed. The speed, in turn, can be used to determine motor torque and the torque can be used to determine whether an obstruction exists in the path of the barrier. All of these approaches do not require the use of costly sensors or sensing devices (such as tachometers).

In one of these embodiments, a barrier operator includes a first measuring apparatus for measuring a current used by a direct current (dc) motor to move a barrier. The barrier operator also includes a second measuring apparatus for measuring a generated voltage of the dc motor. The generated voltage (i.e., the back emf) is created by operating the motor as a generator.

A controller is coupled to the first measuring apparatus and the second measuring apparatus. The controller may be programmed to calculate a torque of the dc motor by using the measured motor current, and then to determine when an obstruction exists in the path of the barrier based upon the calculated torque. The controller may also be programmed to determine a speed of the motor from the generated voltage and determine a position of the barrier using the speed.

The dc motor may be driven by a variety of voltage signals having varying characteristics. For example, the dc motor may be driven by a string of voltage pulses, which contain a plurality of on intervals and off intervals. Preferably, the generated voltage (emf) across the motor is measured during the off intervals.

In others of these embodiments, the barrier operator may only include a measuring apparatus to measure a back emf motor voltage. This measured voltage may be used to determine the speed of the motor and the speed may be used to determine the position of the barrier. In other examples, the speed may be used to directly determine the torque of the motor and the torque may then be used to determine whether an obstruction exists in the path of the barrier.

Thus, a system and method are provided that determine different operating characteristics of a motor without the requirement of additional costly sensors and/or software. The motor characteristics may be used to determine the position of a barrier and/or whether the barrier has encountered an obstruction. These approaches are cost effective and simple to implement, and allow the user the flexibility to choose from a large variety of motors.

Skilled artisans will appreciate that elements in the figures are illustrated for ease of understanding and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION

Figure 1:
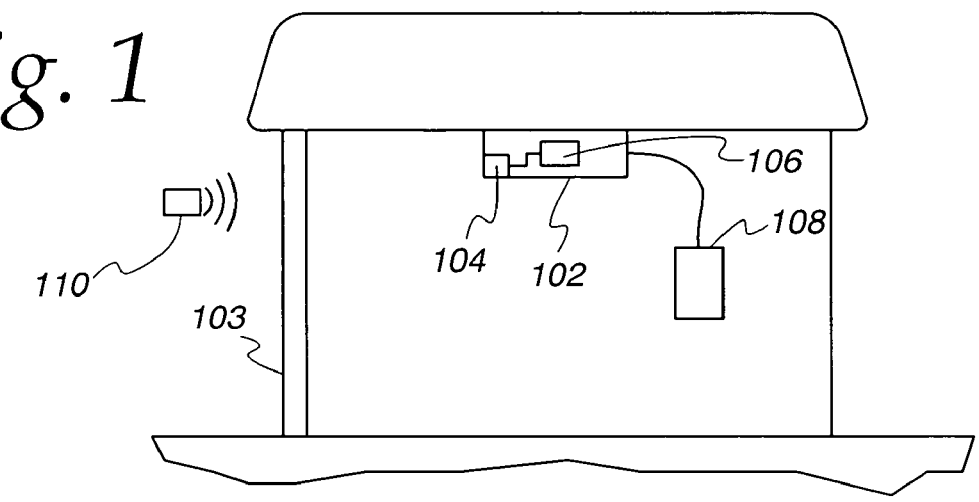
FIG. 1 is a diagram of a system for determining the operating characteristics of a moveable barrier system according to the present invention.

Referring now to the drawings and especially FIG. 1, one example of a system for measuring the operating characteristics of a motor used in a moveable barrier system is described. A barrier operator 102 includes a motor 104 and a controller 106. The motor 104 is coupled to a barrier 103. The motor 104 may be any type of direct current (dc) motor.

The barrier 103 may be any type barrier such as a swinging gate, sliding gate, garage door, swinging door, or shutters. In addition, the operator 102 may be a garage door operator, gate operator, or any other type of barrier operator. Other types of barriers and barrier operators are possible.

A wall control unit 108 is coupled to the operator 102. The wall control unit 108 may include control buttons for example, for opening the barrier 103, closing the barrier 103, or programming the barrier operator 102.

A portable transmitter 110 may be used to open and close the barrier 103. For example, the transmitter 110 may transmit Radio Frequency (RF) signals that are received by the operator 102, which, in turn, actuates the barrier 103.

In one example of the operation of the system of FIG. 1, the motor 104 is operated in a manner that generates a voltage (i.e., the back electromagnetic force (emf)). The speed of the motor 104 can then be determined from the generated back emf voltage. A position of the barrier 103 can be determined using the speed, and the speed of the motor 104 can be adjusted based upon the determined position of the barrier 103.

In addition, the current of the motor 104 can be measured. This current can be used to determine the torque of the motor 104. Then, the torque can be used to determine if the barrier has reached an obstruction. For instance, if the torque exceeds some value or is within some range of values, the barrier 103 may be determined to have reached an obstruction.

The motor 104 can be driven with a string of voltage pulses. This string of pulses includes a plurality of on intervals and off intervals. In one example, the generated back emf voltage is measured during the off intervals of the pulse string.

Figure 2:
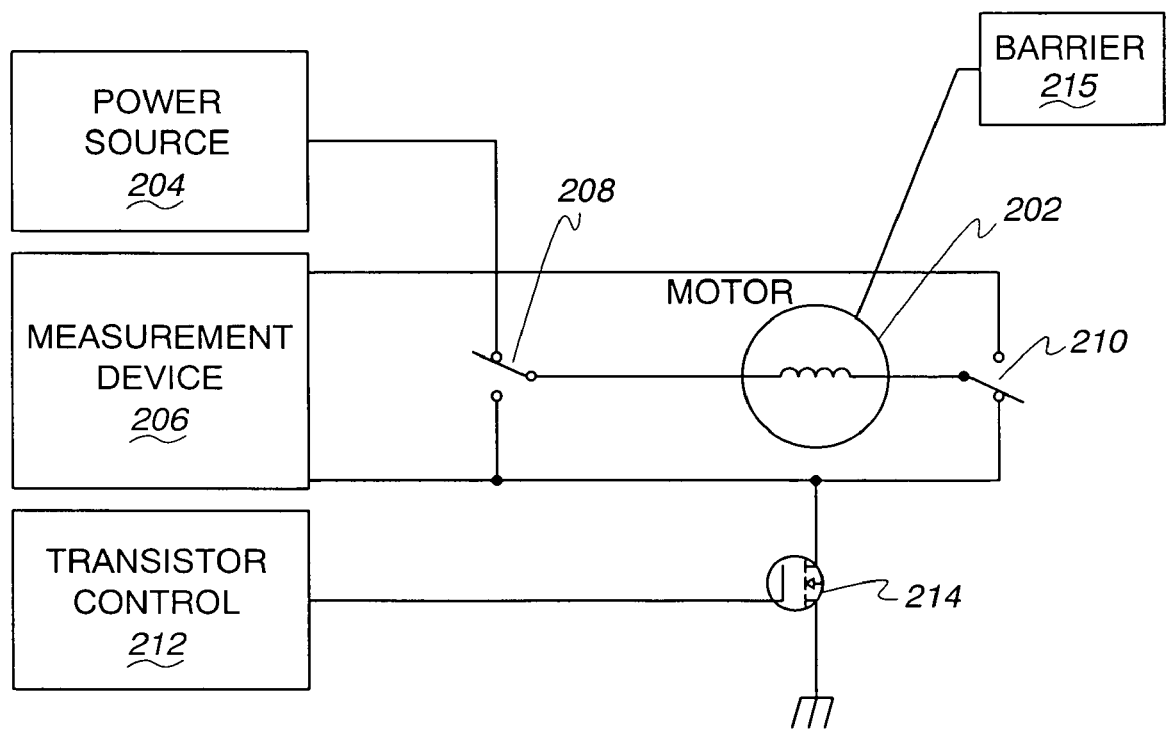
FIG. 2 is a diagram of a system for determining the operating characteristics of a motor sued in a moveable barrier system according to the present invention.

Referring now to FIG. 2, one approach for determining the operating characteristics of a motor is described. A dc motor 202 is coupled to a power source 204. The power source 204 may be any direct current (dc) power source. A measurement device 206 (or devices) is coupled to the motor 202. The measurement device 206 may include any combination of electronic hardware and/or computer software to measure the voltage at different points in the system. In this regard, the measurement device may include a controller or microprocessor.

Switches 208 and 210 are used to selectively connect and disconnect the motor 202 to the power source 204. A transistor control device 212 is used to control the current through the switches 208 and 210 via a transistor 214. The transistor 214 may be a field effect transistor (FET) or other similar device.

Positional information concerning a barrier 215 moved by the motor 202 is determined by measuring and analyzing the voltage across the motor 202 while the motor 202 is disconnected from the power source 204. Specifically, when the motor 202 is disconnected from the power source 204, the motor 202 acts as a generator. While acting as a generator, the back emf voltage generated and measured by the measurement device 206 is directly proportional to the speed of the motor 202. The speed of the motor 202 may be measured at a periodic rate and is directly proportional to the distance traveled by the barrier 215. In one example, the position of the barrier 215 can be computed as the second integral of motor speed over time.

In still another example, the measured back emf voltage can be used to directly determine motor speed and the speed can be used to determine motor torque. The motor torque can then be used to determine whether an obstruction is present in the path of the barrier 215.

Torque information concerning the motor 202 can also be determined from the motor current. The current is determined by measuring the voltage across the transistor 214 when the transistor 214 is activated. The resistance between the drain and source (RDS(on)) is known so that the voltage can be calculated using Ohm's law. The voltage can be used to determine motor torque and whether an obstruction exists.

In addition, torque information can be determined if the speed of the motor 202 is known. For example, the known supply voltage, known duty cycle of the supply voltage, and motor torque speed curves can be used to determine the torque of the motor 202 and whether an obstruction exists.

Figure 3:
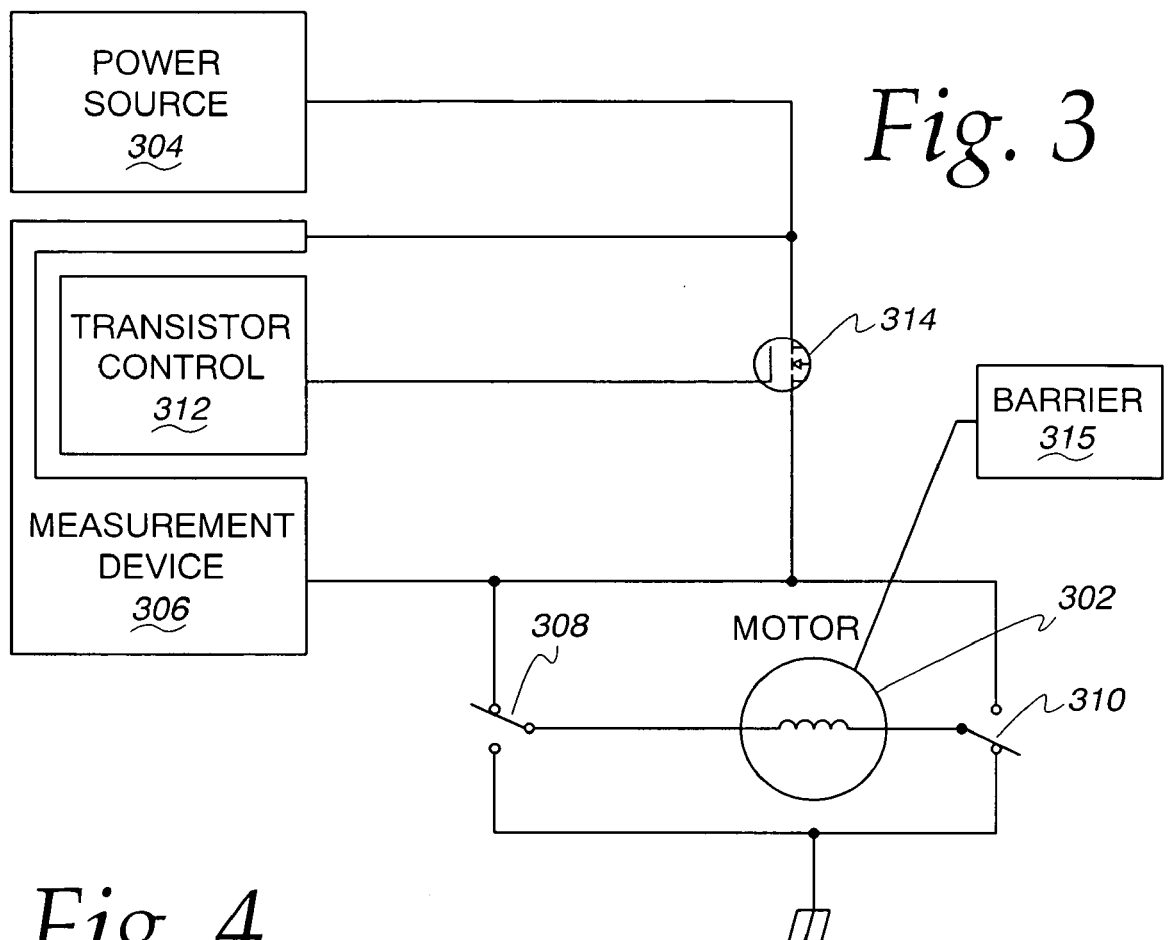
FIG. 3 is a diagram of a system for determining the operating characteristics of a motor sued in a moveable barrier system according to the present invention.

Referring now to FIG. 3, another approach for determining the operating characteristics of a motor that is used to actuate a moveable barrier is described. In this example, the configuration of the transistor and other components has been adjusted with respect to the system illustrated in FIG. 2.

A dc motor 302 is coupled to a power source 304 via a transistor 314. The power source 304 may be any direct current (dc) power source. A measurement device 306 (or devices) is coupled to the motor 302. The measurement device 306 may include any combination of electronic hardware and/or computer software to measure the voltage at different points in the system. In this regard, the measurement device 306 may include a controller or microprocessor.

Switches 308 and 310 are used to selectively connect and disconnect the motor 302 to the power source 304. A transistor control device 312 is used to control the current through the switches 308 and 310 via the transistor 314. The transistor 314 may be a field effect transistor (FET) or similar device.

Positional information concerning a barrier 315 moved by the motor 302 is determined by measuring and analyzing the voltage across the motor 302 while the motor 302 is disconnected from the power source 304. Specifically, when the motor 302 is disconnected from the power source 304, the motor 302 acts as a generator. While acting as a generator, the back emf voltage generated and measured by the measurement device 306 is directly proportional to the speed of the motor 302. The speed of the motor 302 may be measured at a periodic rate and is directly proportional to the distance traveled by the barrier 315. In one example, the position of the barrier 315 can be computed as the second integral of motor speed over time.

In still another example, the measured back emf voltage can be used to directly determine motor speed and the speed can be used to determine motor torque. The motor torque can then be used to determine whether an obstruction is present in the path of the barrier 315.

Torque information concerning the motor 302 can also be determined from the motor current. The current is determined by measuring the voltage across the transistor 314 when the transistor 314 is activated. The resistance between the drain and source (RDS(on)) is known so that the voltage can be calculated using Ohm's law. The voltage can be used to determine motor torque and whether an obstruction exists.

In addition, torque information can be determined if the speed of the motor 302 is known. For example, the known supply voltage, known duty cycle of the supply voltage, and motor torque speed curves can be used to determine the torque of the motor 302 and whether an obstruction exists.

Figure 4:
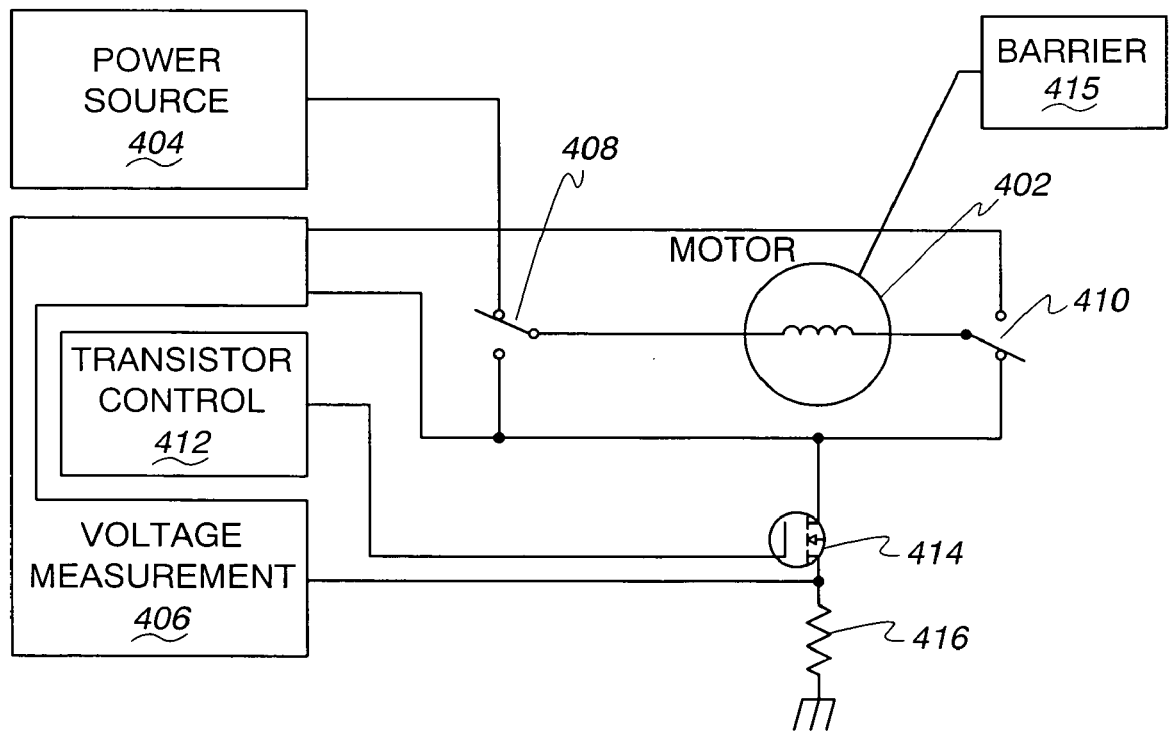
FIG. 4 is a diagram of a system for determining the operating characteristics of a motor sued in a moveable barrier system according to the present invention.

Referring now to FIG. 4, still another approach for determining the operating characteristics of a motor that is used to actuate a moveable barrier is described. A dc motor 402 is coupled to a power source 404. The power source 404 may be any direct current (dc) power source. A measurement device 406 (or devices) is coupled to the motor 402. The measurement device 406 may include any combination of electronic hardware and/or computer software to measure the voltage at different points in the system. In this regard, the measurement device 406 may include a controller or microprocessor.

Switches 408 and 410 are used to selectively connect and disconnect the motor 402 to the power source 404. A transistor control device 412 is used to control the current through the switches 408 and 410 via a transistor 414. The transistor 414 may be a field effect transistor (FET) or other similar device. A resistor 416 is coupled to the transistor 414 and the measurement device 406.

Positional information concerning a barrier 415 moved by the motor 402 is determined by measuring and analyzing the voltage across the motor 402 while the motor 402 is disconnected from the power source 404. Specifically, when the motor 402 is disconnected from the power source 404, the motor 402 acts as a generator. While acting as a generator, the back emf voltage generated and measured at the measurement device 406 is directly proportional to the speed of the motor 402. The speed of the motor 402 may be measured at a periodic rate and is directly proportional to the distance traveled by the barrier 415. In one example, the position of the barrier 415 can be computed as the second integral of motor speed over time.

In still another example, the measured voltage can be used to directly determine motor speed and the speed can be used to determine motor torque. The motor torque can then be used to determine whether an obstruction is present in the path of the barrier 415.

Torque information concerning the motor 402 can also be determined from the motor current. The current is determined by measuring the voltage across the resistor 416 when the transistor 414 is activated. The resistance of the resistor 416 is known so that the voltage can be calculated using Ohm's law. The voltage can be used to determine motor torque and whether an obstruction exists.

Figure 5:
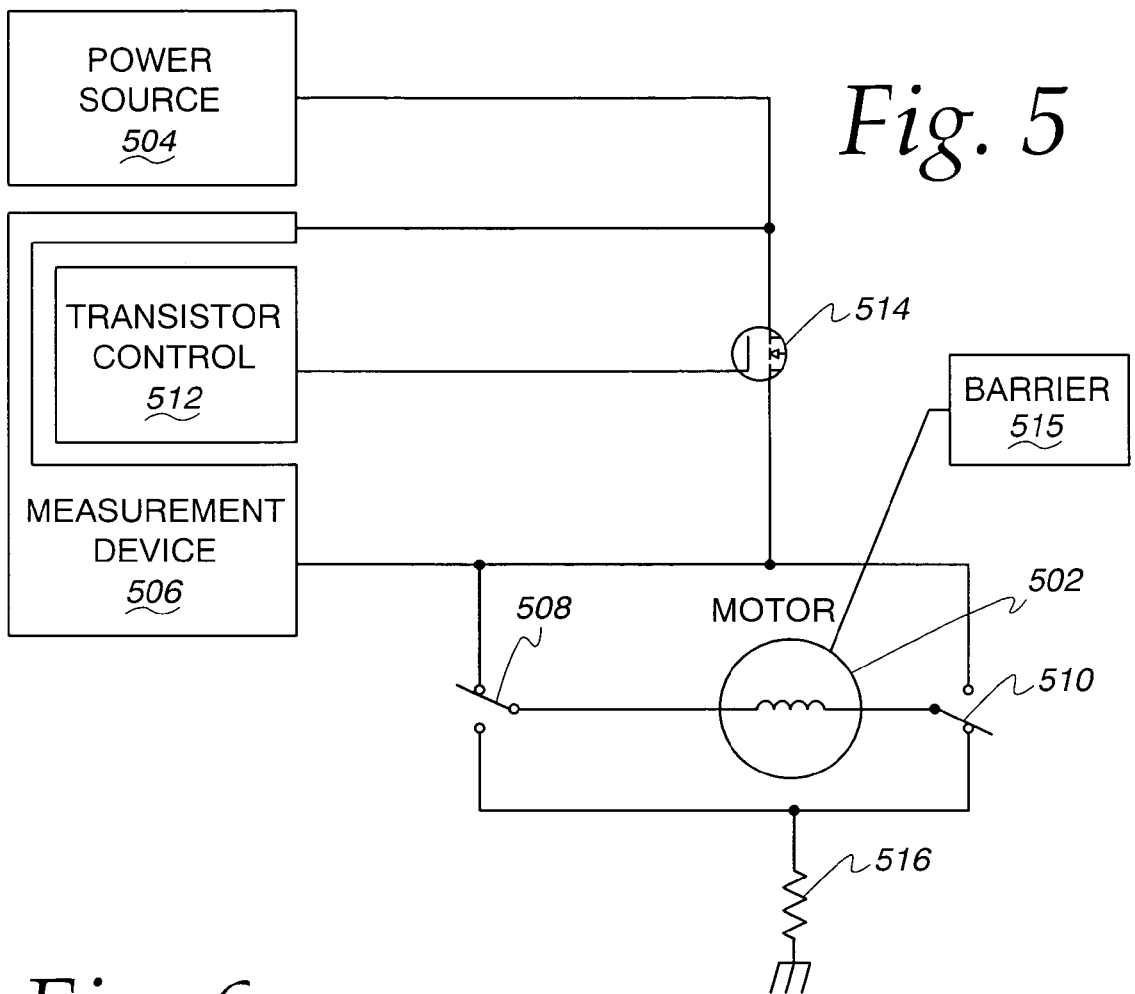
FIG. 5 is a diagram of a system for determining the operating characteristics of a motor sued in a moveable barrier system according to the present invention.

Referring now to FIG. 5, yet another approach for determining the operating characteristics of a motor that is used to actuate a moveable barrier is described. In this example, the configuration of the transistor and other components has been adjusted with respect to the system illustrated in FIG. 4.

A dc motor 502 is coupled to a power source 504 via a transistor 514. The power source 504 may be any direct current (dc) power source. A measurement device 506 (or devices) is coupled to the motor 502. The measurement device 506 may include any combination of electronic hardware and/or computer software to measure the voltage at different points in the system. In this regard, the measurement device 506 may include a controller or microprocessor.

Switches 508 and 510 are used to selectively connect and disconnect the motor 502 to the power source 504. A transistor control device 512 is used to control the current through the switches 508 and 510 via the transistor 514. The transistor 514 may be a field effect transistor (FET) or other similar device. A resistor 516 is coupled to the transistor 514 and the measurement device 506.

Positional information concerning a barrier 515 moved by the motor 502 is determined by measuring and analyzing the voltage across the motor 502 while the motor 502 is disconnected from the power source 504. Specifically, when the motor 502 is disconnected from the power source 504, the motor 502 acts as a generator. While acting as a generator, the back emf voltage generated and measured by the measurement device 506 is directly proportional to the speed of the motor 502. The speed of the motor 502 may be measured at a periodic rate and is directly proportional to the distance traveled by the barrier 515. In one example, the position of the barrier 515 can be computed as the second integral of motor speed over time.

In still another example, the measured voltage can be used to directly determine motor speed and the speed can be used to determine motor torque. The motor torque can then be used to determine whether an obstruction is present in the path of the barrier 515.

Torque information concerning the motor 502 can also be determined from the motor current. The current is determined by measuring the voltage across the resistor 516 when the transistor 514 is activated. The resistance of the resistor 516 is known so that the voltage can be calculated using Ohm's law. The voltage can be used to determine motor torque and whether an obstruction exists.

Figure 6:
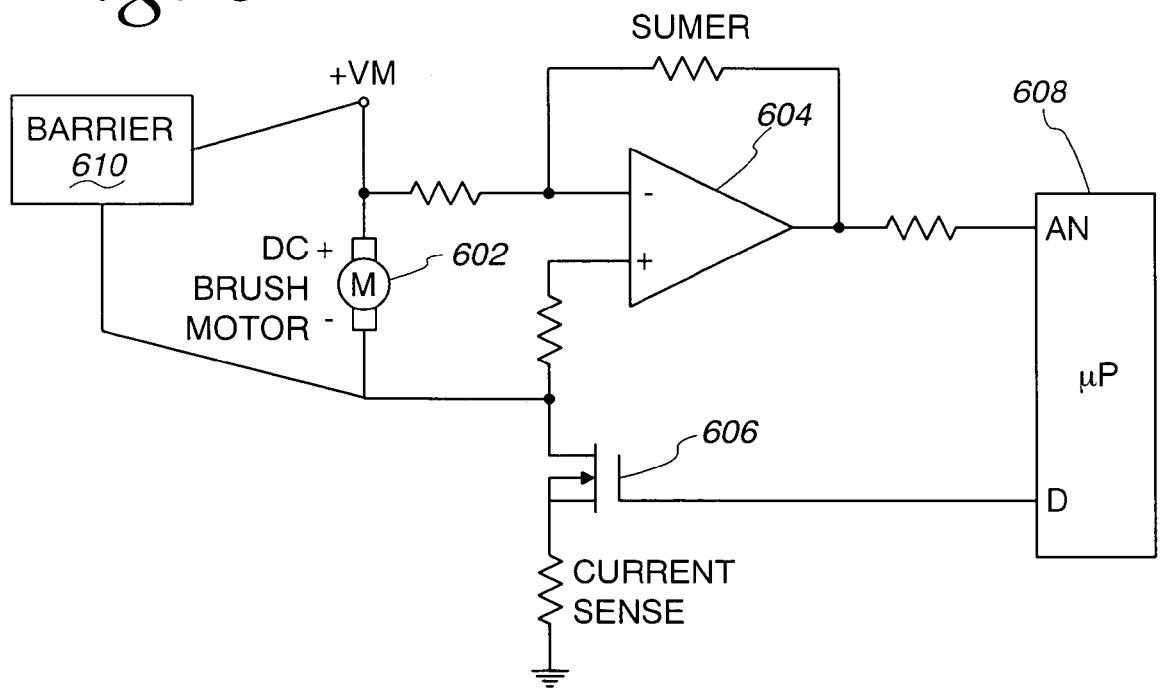
FIG. 6 is a diagram of a system for determining the operating characteristics of a motor sued in a moveable barrier system according to the present invention.

Referring now to FIG. 6, yet another approach for determining the operating characteristics of a motor that is used to actuate a moveable barrier is described. A dc motor 602 is coupled to a summing amplifier 604 and a Field Effect Transistor (FET) 606. A microprocessor 608 is coupled to the summing amplifier 604. The microprocessor 608 may be any suitable microprocessor that is capable of performing voltage measurements.

When the microprocessor 608 deactivates the FET 606, the back emf voltage at an input of the microprocessor 608 is read by the microprocessor 608. As the speed to the motor 602 increases, the voltage at the input of the microprocessor 608 also rises. The magnitude of this voltage depends upon the speed of the motor 602 only and is independent of the load of the motor 602.

The voltage measured can be used to determine speed, and the speed can be used to determine a position of a barrier 610, which is coupled to the motor 602. Alternatively, the speed can be used to determine the torque of the motor 602, and the torque can be used to determine whether an obstruction exists in the path of the barrier 610.

Figure 7:
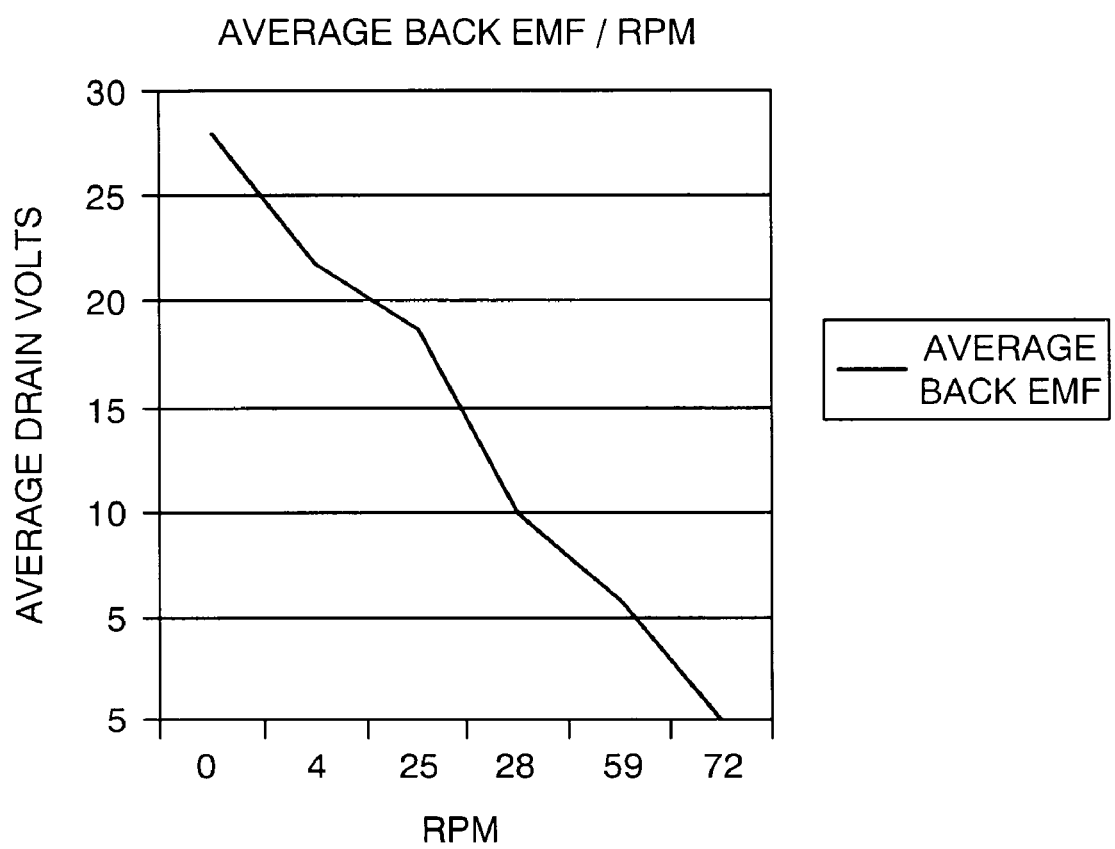
FIG. 7 is a graph of the average back emf versus average voltage across the motor of the system of FIG. 6 according to the present invention.

Referring now to FIG. 7, a graph of the performance characteristics of the system of FIG. 6 is described. The data describes the voltage at the drain of the FET 606 when a Pulse Width Modulated (PWM) signal originating from the microprocessor 602 is used to drive the FET 606. In this example, the motor supply voltage is a full wave rectified Alternating Current (AC) with a peak voltage of around 28 volts.

The PWM signal transmitted by the microprocessor 608 is synchronized with the supply voltage. The data shown in the graph shows that the average voltage on the drain of the FET 606 (while the FET is deactivated) is inversely proportional to the speed (RPM) of the motor.

The back emf voltage of the motor 602 is read by the microprocessor 608 as the average voltage at the drain of the FET 606 while the FET is deactivated. This average voltage is, in turn, inversely proportional to the actual shaft speed of the motor. The determined speed can be used to determine the position of the barrier 610. Based upon the position of the barrier 610, the speed may be adjusted. For instance, if the speed is high when the position of the barrier is near the ground, the speed may be slowed in order that the barrier not crash into the ground.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A barrier operator comprising:

a direct current (dc) motor;

a first measuring apparatus for measuring a current used by the direct current (dc) motor to move a barrier;

a second measuring apparatus for measuring a generated voltage of the dc motor, the dc motor being driven by a string of voltage pulses, the string of pulses having a plurality of on intervals and off intervals and the second measuring apparatus measuring the voltage during at least one of the string of the off intervals when the motor is operating at a range of speeds during a cycle of opening and closing a barrier;

a controller coupled to the first measuring apparatus and the second measuring apparatus, the controller programmed to calculate a torque of the dc motor by using the current and to determine when an obstruction exists in the path of the barrier based upon the calculated torque, the controller being programmed to determine a speed of the motor from the generated voltage, and to determine a position of the barrier using the speed; and wherein the controller is programmed to responsively adjust the speed of the motor based upon the position of the barrier anywhere over a continuous speed range and anywhere along a path of the barrier based upon the determined position of the barrier.

2. The barrier operator of claim 1 wherein the controller halts a movement of the barrier when an obstruction exists.

3. The barrier operator of claim 1 wherein the barrier is selected from the group consisting of a garage door, a swinging door, a sliding gate, a swinging gate, and shutters.

4. A barrier operator comprising:

a direct current (dc) motor;

a measuring apparatus for measuring a generated voltage of the dc motor;

a controller coupled to the measuring apparatus, the controller programmed to determine a speed of the motor from the generated voltage, determine a position of a barrier using the speed, and based upon the position of the barrier responsively adjusting the speed of the motor anywhere when the motor is operating at a range of speeds during a cycle of opening and closing a barrier, the speed adjustment anywhere along a path of the barrier based upon the determined position of the barrier, the dc motor being driven by a string of voltage pulses, the string of pulses having a plurality of on intervals and off intervals and the measuring apparatus measuring the generated voltage during at least one of the string of the off intervals.

5. The barrier operator of claim 4 wherein the barrier is selected from the group consisting of a garage door, a swinging door, a sliding gate, a swinging gate, and shutters.

* * * * *